United States Patent [19]
Yamada et al.

[11] Patent Number: 6,162,887
[45] Date of Patent: Dec. 19, 2000

[54] HIGHLY CRYSTALLINE POLYPROPYLENE

[75] Inventors: Koji Yamada, Oita; Yoshiharu Iwasaki, Kawasaki, both of Japan

[73] Assignee: Japan Polyolefins Co., Ltd., Tokyo, Japan

[21] Appl. No.: 09/043,886

[22] PCT Filed: Jul. 31, 1997

[86] PCT No.: PCT/JP97/02659

§ 371 Date: Mar. 30, 1998

§ 102(e) Date: Mar. 30, 1998

[87] PCT Pub. No.: WO98/04600

PCT Pub. Date: Feb. 5, 1998

[30] Foreign Application Priority Data

Jul. 31, 1996 [JP] Japan ................................. 8-202646

[51] Int. Cl.$^7$ ............................. C08F 10/06; C08L 23/12
[52] U.S. Cl. .................. 526/351; 526/348.1; 525/240; 524/451; 524/570; 524/584; 428/364; 428/523
[58] Field of Search ................................. 526/351, 348.1; 525/240, 191; 264/331.15, 345, 344; 428/523, 364

[56] References Cited

U.S. PATENT DOCUMENTS

| | | | |
|---|---|---|---|
| 4,560,734 | 12/1985 | Fujishita et al. | 526/142 |
| 4,769,510 | 9/1988 | Kaminsky et al. | 585/512 |
| 5,532,325 | 7/1996 | Oka et al. | 526/79 |
| 5,548,013 | 8/1996 | Fujii et al. | 524/449 |
| 5,563,194 | 10/1996 | Watanabe et al. | 524/117 |
| 5,616,664 | 4/1997 | Timmers et al. | 526/127 |
| 5,916,990 | 6/1999 | Yanagihara et al. | 526/351 |

FOREIGN PATENT DOCUMENTS

| | | | |
|---|---|---|---|
| 7-206923 | 8/1995 | Japan | C08F 4/658 |
| 8-198979 | 8/1996 | Japan | C08J 5/18 |

OTHER PUBLICATIONS

Kaminsky, Walter, "New polymers by metallocene catalysis", Macromol. Chem. Phys. 197, 3907–3945 (1996).
International Search Report.

*Primary Examiner*—David W. Wu
*Assistant Examiner*—R. Rabago
*Attorney, Agent, or Firm*—Sughrue, Mion, Zinn Macpeak & Seas, PLLC

[57] ABSTRACT

A highly crystalline polypropylene having a degree of crystallinity of at least 50.5% calculated from the heat of melting; and a relationship between a proportion f(R) of R-lamella with respect to spherulites and a weight-average molecular weight Mw which satisfies the following Formula (II). The above-mentioned proportion f(R) of R-lamella spherulites is calculated using the following Formula (I) from the birefringence Δn of crystallized spherulites obtained by melting said highly crystalline polypropylene at 230° C. for 5 minutes, cooling to a temperature of 132° C. at a cooling rate of 20° C./minute, and then maintaining said temperature for 90 minutes. Molded articles obtained using the above-mentioned highly crystalline polypropylene or a resin composition containing the above-mentioned highly crystalline polypropylene resin are superior in rigidity, heat resistance, scratch resistance, dimensional stability, and low production of odor during molding, and can be widely used in various applications.

$f(R) = (-\Delta n + 0.0351) \times 100 / 0.0528$  Formula (I)

$f(R) > -2.5 \times (\log\{Mw\} - 4)^2 + 88.9$  Formula (II).

22 Claims, 2 Drawing Sheets

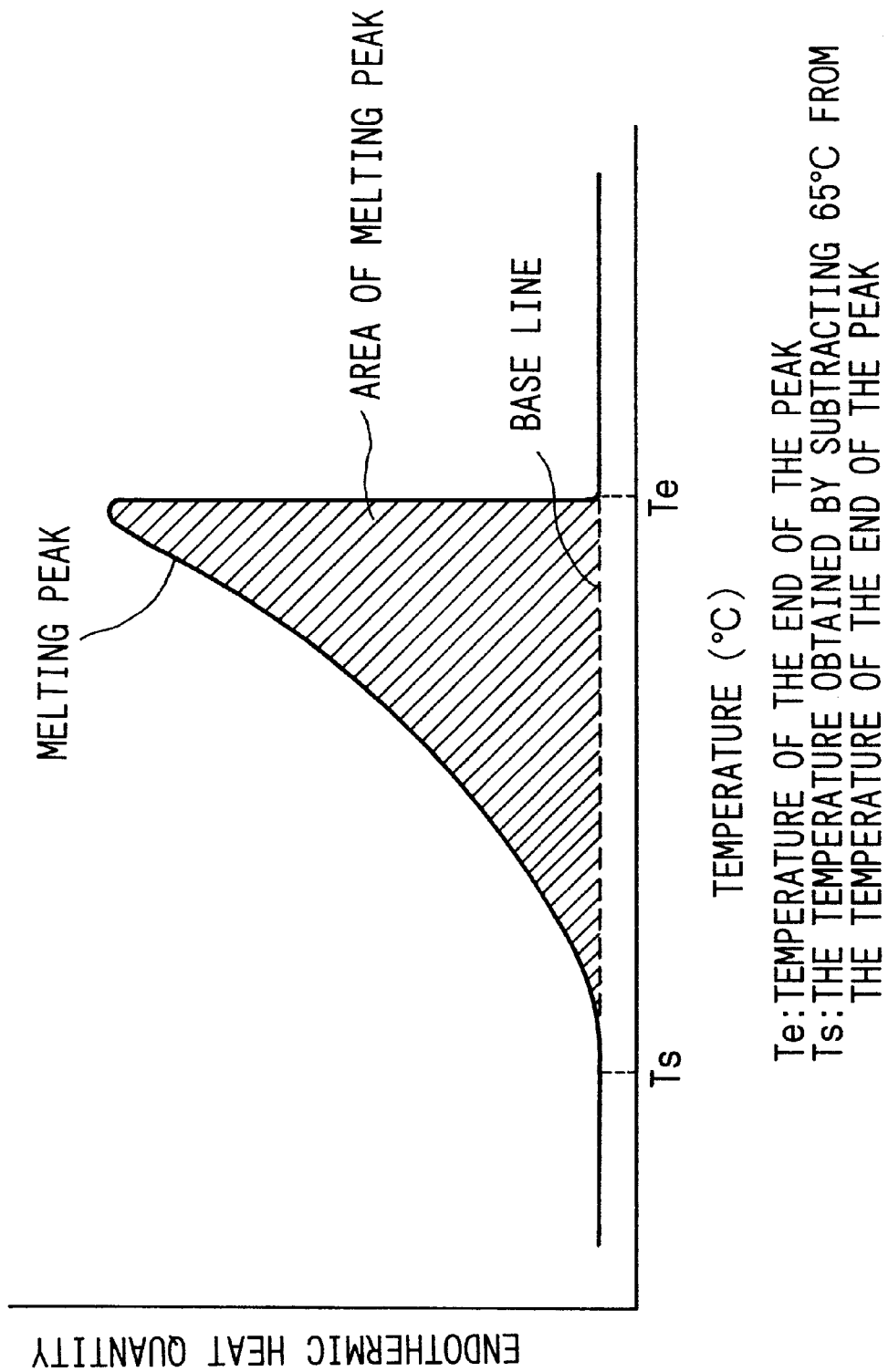

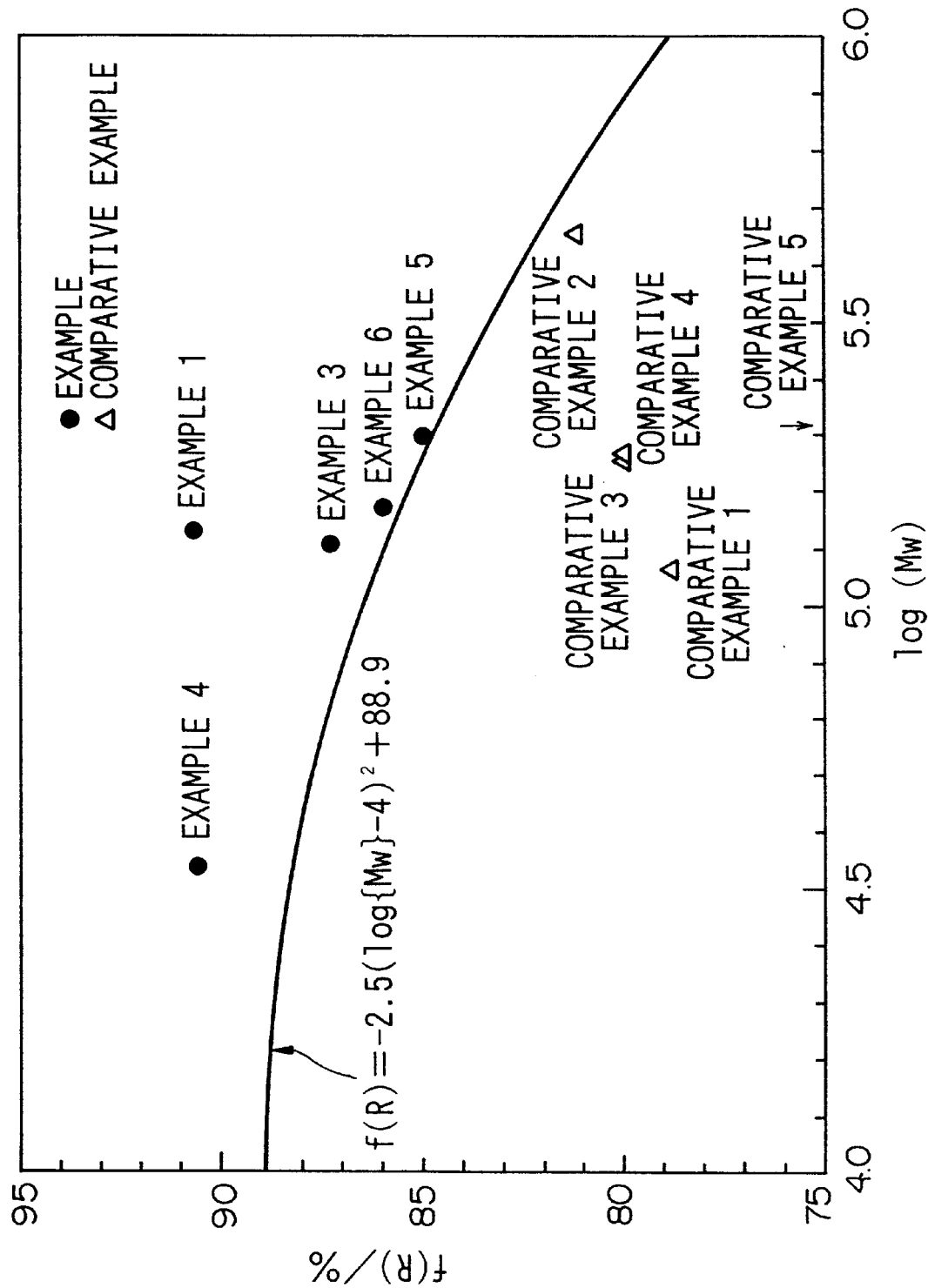

HIGHLY CRYSTALLINE POLYPROPYLENE

TECHNICAL FIELD

The present invention relates to a highly crystalline polypropylene, to a resin which contains this highly crystalline polypropylene, and to molded products made from them. In more detail, the present invention relates to a highly crystalline polypropylene having a high degree of crystallinity and having a specific spherulite structure, to a resin which contains this polypropylene resin, and to molded products having a high rigidity which are molded from these resins.

BACKGROUND ART

Crystalline polypropylene is an excellent material in extensive use which has comparatively good mechanical and thermal characteristics. It is known that mechanical characteristics and thermal characteristics are closely related to the degree of crystallinity, and research to increase the crystallinity of crystalline polypropylene is proceeding.

In general, with the goal of improving mechanical and thermal properties of polypropylene, control of the stereoregularity, molecular weight, and molecular weight distribution (for example, Japanese Patent Application, First Publication, No. 62-195007), the addition of crystal nucleating agents (for example, Japanese Patent Application, First Publication, No. 62-209151), the addition of various filling agents such as fiber (for example, Japanese Patent Application, First Publication, No. 61-160359), the carrying out heat treatments after molding (for example, Japanese Patent Application, First Publication, No. 62-256837), and the like have been attempted. However, when crystalline polypropylenes have been obtained by crystallization under normally used molding conditions, the degree of crystallinity of the polypropylene is not sufficiently increased because the rate of crystallization of the polypropylene is slow.

Polypropylenes are crystalline high polymers, and when crystallized without orientation, spherulites are formed. These spherulites are formed from lath like crystals called lamella, but in situations of polypropylene spherulites of a normal monoclinic crystal (α-crystal), it is known that they comprise lamellae which extend radiating from the center of the spherulite (herein after referred to as R-lamella) and lamellae which extend at angle of approximately 80 degrees 40 minutes from the R-lamella (hereinafter referred to as T-lamella).

Because of the presence of this type of spherulite structure, it has not been possible to improve the degree of crystallinity and, as a result, it has not been possible to improve rigidity. In addition, because the lamella thickness of the T-lamella is thin compared with the thickness of the R-lamella, the melting point is low and, therefore, the heat distortion temperature is also low.

SUMMARY OF THE INVENTION

The first object of the present invention is the provision of a highly crystalline polypropylene for which the degree of crystallinity is sufficiently high and which is superior in mechanical and thermal characteristics, and a resin composition which contains this highly crystalline polypropylene.

The second object of the present invention is the provision of molded products which are superior in mechanical and thermal characteristics and which comprise a highly crystalline polypropylene or a resin composition which contains this highly crystalline polypropylene.

The highly crystalline polypropylene of the present invention is characterized by a degree of crystallinity of at least 50.5% calculated from the heat of fusion; and by a relationship between the proportion of R-lamella f(R) with respect to spherulites calculated using the following formula (I) and the weight-average molecular weight Mw, wherein the relationship satisfies the following Formula (II), and wherein the proportion of R-lamella f(R) with respect to spherulites is calculated using the following Formula (I) from the birefringence Δn of crystallized spherulites which were obtained by melting the highly crystalline polypropylene at 230° C. for 5 minutes, cooling it to 132° C. at a cooling rate of 20° C./minute, and then maintaining the temperature for 90 minutes.

$$f(R) = (-\Delta n + 0.0351) \times 100/0.0528 \quad \text{Formula (I)}$$

$$f(R) > -2.5 \times (\log\{Mw\} - 4)^2 + 88.9 \quad \text{Formula (II)}$$

After the above-mentioned highly crystalline polypropylene has been melted, it is possible for crystallization to occur at at least 130° C. and at less than 160° C.

The resin composition of the present invention is a resin composition comprising 100 parts by weight of the above-mentioned highly crystalline polypropylene and no more than 30 parts by weight of talc; a resin composition comprising at least 30% by weight of the above-mentioned highly crystalline polypropylene and no more than 70% by weight of a propylene/α-olefin block copolymer; a resin composition comprising at least 60% by weight of the above-mentioned highly crystalline polypropylene and no more than 40% by weight of an ethylene-propylene rubber; or a resin composition comprising 100 parts by weight of a mixture which comprises at least 30% by weight of the above-mentioned highly crystalline polypropylene and no more than 70% by weight of a propylene/α-olefin block copolymer; and no more than 30 parts by weight of talc.

In addition, the present invention also provides injection molded products, blow molded products, compression molded products, sheets, films, laminate molded products, extrusion molded products and fibers obtained by molding the above-mentioned highly crystalline polypropylene and the above-mentioned resin composition.

BRIEF DESCRIPTION OF THE DRAWINGS

FIG. 1 is diagram showing an example of a melting peak for DSC.

FIG. 2 is a diagram showing the relationship of the proportion of R-lamella f(R) with respect to spherulites and the weight-average molecular weight Mw.

DESCRIPTION OF THE PREFERRED EMBODIMENTS

In the present invention, the degree of crystallinity calculated from the heat of fusion is a proportion calculated by dividing the heat of fusion (J/g) calculated from the area of the melting peak measured using a differential scanning calorimeter (hereinafter referred to as DSC) by the theoretical heat of fusion 209 J/g of the perfect polypropylene crystal which is described in Polymer Handbook Third Edition (John Wiley & Sons Inc.) by J. Brandrups et al.

Here, the heat of fusion, which is calculated from the area of the melting peak measured using a DSC, is calculated with regard to a DSC melting peak obtained under conditions in which 2.5~3.0 mg of a 100 μm thick sample are melted at 230° C. under a nitrogen atmosphere for 5 minutes, then cooled to the crystallizing temperature at a cooling rate of 100° C./minute, maintained at the temperature for a time (more specifically, a period of time long enough for the entire surface area of the film to become filled with spherulites as observed by a microscope) long enough for crystallization to sufficiently occur, then cooled to 30° C. at the same rate, maintained at 30° C. for 5 minutes, and heated to 230° C. at a rate of 10° C./minute. The area is calculated for a peak with a base line formed by a straight line drawn between the point at which the peak ends and the point which corresponds to the temperature obtained by subtracting 65° C. from the temperature at which the peak finished. FIG. 1 shows an example of a DSC melting peak.

The degree of crystallinity calculated from the heat of fusion of the highly crystalline polypropylene of the present invention (hereinafter simply referred to as "degree of crystallinity") is at least 50.5%, preferably at least 52%, and even more preferably at least 54%. When this degree of crystallinity is less than 50.5%, it is not possible to obtain a polypropylene having sufficient mechanical and thermal characteristics such as rigidity and a heat distortion temperature. The highly crystalline polypropylene of the present invention has a degree of crystallinity calculated from the heat of fusion measured using a DSC of at least 50.5%, but the proportion of crystallinity when crystallization occurs under other conditions does not have to be at least 50.5%.

The birefringence Δn of the spherulites in the above-mentioned highly crystalline polypropylene is a refractive index obtained by dividing the retardation (optical path difference), which can be measured by installing a compensator on a polarizing microscope under a cross polarized light, by the thickness of the film sample.

For the calculation of the birefringence Δn of the spherulites in the above-mentioned highly crystalline polypropylene of the present invention, a film of 15 μm in thickness is placed between a slide glass and a cover glass and melted at 230° C. for 5 minutes, then, after cooling it to a temperature of 132° C. at a cooling rate of 20° C./minute, it is maintained for 90 minutes to allow crystallization such that the whole surface area of the film fills with spherulites, and then the sample is left at room temperature (approximately 25° C.) to cool. The birefringence Δn is then calculated by dividing the value (optical path difference) for this sample measured using a polarizing microscope and a Berek type conpensator by the thickness of the sample after this measurement is finished.

With regard to the positivity or negativity of the birefringence, this can be determined easily by means of the insertion of a sensitive color plate in the polarizing microscope.

In the highly crystalline polypropylene of the present invention, the birefringence index of spherulites crystallized at a temperature of at least 130° C. and less than 137° C., preferably at least 130° C. and less than 135° C., and more preferably 130° C. and less than 133° C., is no more than −0.0080, preferably no more than −0.0100, and more preferably no more than −0.0120.

The birefringence index of conventional monoclinic polypropylene spherulites is described by F.J. Padden Jr. et al in the Journal of Applied Physics, 30, 1479 (1959), and by D.R. Norton et al in Polymer, 26, 704 (1985). According to the latter publication, it is known that spherulites having a positive birefringence form at 137° C. or lower, and that spherulites having a negative birefringence form at 136° C. or greater.

As mentioned above, in general, it is known that spherulites of polypropylene comprise R-lamellae which extend radiating from the center of the spherulite and T-lamellae which extend at an angle of approximately 80 degrees 40 minutes from the R-lamella.

With regard to the calculation method of the proportion of R-lamella, there are the methods disclosed in Takahara et al, Sen-i Gakkaishi, 23, 571 (1967), and Awaya, Koubunshi Kagaku, 29, 101 (1972), more specifically, by considering the refractive index of each axial direction of the crystal lattice of the polypropylene, it is possible to determine the relationship between the proportion of R-lamella and the birefringent index, which is the difference between the refractive index in the radial direction of the spherulites and the refractive index in a direction at right angles to the radial direction. More specifically, the relationship between the birefringent index and the proportion of R-lamella can be expressed by means of the following Formula (I).

$$f(R)=(-\Delta n+0.0351)\times 100/0.0528 \qquad \text{Formula (I)}$$

Here, Δn is the birefringent index, and f(R) is the proportion of R-lamella.

A characterizing feature of the highly crystalline polypropylene of the present invention is that the relationship between the weight-average molecular weight Mw and the proportion of R-lamella f(R) with respect to spherulites calculated by means of the above-mentioned Formula (I) satisfies the follow Formula (II).

$$f(R)>-2.5\times(\log[\text{Mw}]-4)^2+88.9 \qquad \text{Formula (II)}$$

If the above-mentioned Formula (II) is not satisfied, the degree of crystallinity is low, and there are many T-lamella, which have a low melting point, therefore, satisfactory thermal characteristics cannot be obtained.

With regard to the highly crystalline polypropylene of the present invention, the polypropylene prior to the measurement of birefringence does not necessarily have to satisfy the above-mentioned Formula (II), but after being melted at 230° C. for 5 minutes, being cooled to 132° C. at a cooling rate of 20° C./minute and being maintained at that temperature for 90 minutes and allowed to crystallize, it is preferable for the polypropylene to satisfy the above-mentioned Formula (II).

The growth rate of the spherulites of the highly crystalline polypropylene of the present invention is, at a temperature of 132° C., preferably at least 2 μm/minute, and more preferably at least 5 μm/minute. When the growth rate is less than 2 μm/minute, because the rate of crystallization is slow, it is not possible to increase the molding cycle and productivity deteriorates. The growth rate of spherulites is, in general, the linear growth rate of spherulites as measured during the crystallization process, and can be measured by holding a thin film between slide glasses on a hot stage, and observing the growth of spherulites produced by crystallization using a microscope.

In addition, the highly crystalline polypropylene obtained by melting the highly crystalline polypropylene of the present invention, and then allowing it to crystallize for a crystallization period of at least 1 minute and less than 300 hours at a crystallization temperature of at least 130° C. and less than 160° C., preferably at a temperature of at least 145° C. and less than 160° C., and more preferably at a temperature of at least 150° C. and less than 160° C., has a high proportion of R-lamella, and is excellent in mechanical and thermal properties.

The method for crystallization is not particularly limited, and methods in which a hot stage is used and a polypropylene film is held between slide glasses and crystallization allowed to occur, methods in which crystallization occurs in an oil bath, methods in which crystallization occurs within a mold, and the like can be mentioned.

When the crystallization temperature is lower than 130° C., improvements in rigidity are insufficient and, when the crystallization temperature is 160° C. or greater, the rate of crystallization is low. The length of the time for the crystallization differs depending on the temperature at which crystallization occurs. When the crystallization temperature is high, a long period of time is necessary and, when the crystallization temperature is low, a comparatively short period of time is sufficient. For example, at a temperature of 130° C., a time of at least 1 minute and less than 60 minutes is preferable, and, at a temperature of 160° C., a time of at least 72 hours and less than 300 hours is preferable. When the length of time for the crystallization is short with respect to the crystallization temperature, since crystallization does not sufficiently occur, the properties of the polypropylene are not sufficiently realized, and when the length of time for the crystallization is long, not only is production efficiency not improved due to a deterioration in the molding cycle, but thermal degradation of the polypropylene may also occur.

In the following, a manufacturing method for the highly crystalline polypropylene of the present invention is explained, but the present invention is not limited to this method.

As the starting material for the highly crystalline polypropylene of the present invention, it is preferable to use a material which has been polymerized using a catalyst which can be used to manufacture a polypropylene having stereoregularity and a isotactic pentad index ([mmmm]%) which is an indicator of stereoregularity, of at least 99.3% as measured using nuclear magnetic resonance ($^{13}$C-NMR). For example, the use of the catalysts disclosed in Japanese Patent Application, First Publication, No. Hei 6-136054 and Japanese Patent Application, First Publication, No. Hei 7-292022 are preferable, for example, it is preferable to use a polymerization catalyst component obtained by preparing a solid catalyst containing, as essential components, a magnesium compound, a titanium compound, a halogen compound, or an electron donating compound, then, additionally, conducting one or more treatments with an electron donating compound, and two or more treatments with a halogen-containing compound.

As the above-mentioned magnesium compound used in the preparation of the above-mentioned solid catalyst, magnesium halides such as magnesium chloride, magnesium bromide, and magnesium iodide; magnesium alkoxides such as magnesium dimethoxide, magnesium diethoxide, magnesium dipropoxide, magnesium dibutoxide, and magnesium diphenoxide; carboxylic acid salts such as magnesium laurate, magnesium stearate, and magnesium acetate; alkyl magnesium such as dimethyl magnesium, and diethyl magnesium, butylethyl magnesium, and the like can be mentioned as examples.

In addition, it is possible to use these various magnesium compounds singly and independently, or they can be used in combinations of two or more. It is preferable to use magnesium halides or magnesium alkoxides, or to form magnesium halides when forming the catalyst. In particular, it is preferable if the above mentioned halogen is chlorine.

As the titanium compound used in the preparation of the above-mentioned solid catalyst, titanium halides such as titanium tetrachloride, titanium trichloride, titanium tetrabromide, and titanium tetraiodide; titanium alkoxide such as titanium tetramethoxide, titanium tetraethoxide, titanium tetrapropoxide, titanium tetrabutoxide, and titanium tetraphenoxide; alkoxy titanium halides such as ethoxy titanium chloride, butoxy titanium chloride, phenoxy titanium chloride, dibutoxy titanium chloride, and tributoxy titanium chloride; and the like can be mentioned as examples.

In addition, it is possible to use these various titanium compounds singly and independently, or they can be used in combinations of two or more. It is preferable to use tetravalent titanium compounds which contain halogen, and the use of titanium tetrachloride is particularly preferable.

The halogen-containing compounds used in the preparation of the above-mentioned solid catalyst are compounds in which the halogen is fluorine, chlorine, bromine, or iodine, and chlorine is preferable. Specific compounds which can be given as examples depend on the method of preparation of the catalyst, but titanium halides such as titanium tetrachloride and titanium tetrabromide; silicon halides such as silicon tetrachloride, and silicone tetrabromide; phosphorous halides such as phosphorous trichloride, and phosphorous pentachloride; and the like can be mentioned. In addition, depending on the preparation method for the catalyst, hydrocarbon halides, halogen molecules, and hydrohalogenic acids can also be used.

As the electron donating compounds used in the preparation of the above-mentioned solid catalyst, in general, oxygen-containing compounds, nitrogen-containing compounds, phosphorous-containing compounds, sulfur-containing compounds, and the like can be mentioned. As oxygen-containing compounds, for example, alcohols, ethers, esters, acid halides, acid anhydrides, and the like can be mentioned. Furthermore, in more detail, alcohols such as methanol, ethanol, propyl alcohol, butyl alcohol, pentyl alcohol, hexyl alcohol, heptyl alcohol, octyl alcohol, nonyl alcohol, decyl alcohol, 2-ethylhexyl alcohol, oleyl alcohol, benzyl alcohol, phenylethyl alcohol, phenol, cresol, ethylphenol, and naphthol; ethers and diethers such as methyl ether, ethyl ether, propyl ether, butyl ether, amyl ether, hexyl ether, tetrahydrofuran, anisole, diphenyl ether; esters such as ethyl acetate, ethyl chloroacetate, ethyl propionate, ethyl butyrate, ethyl acrylate, ethyl crotonate, ethyl oleate, ethyl stearate, ethyl phenyl acetate, methyl benzoate, ethyl benzoate, propyl benzoate, butyl benzoate, methyl toluylate, ethyl toluylate, propyl toluylate, butyl toluylate, methylethyl benzoate, methyl anisate, ethyl anisate, methyl ethoxy benzoate, ethly ethoxy benzoate, ethyl cinnamate, dimethyl phthalate, diethyl phthalate, dipropyl phthalate, di-n-butyl phthalate, diisobutyl phthalate, dihexyl phthalate, dioctyl phthalate, γ-butylolactone, δ-valerolactone, and ethylene carbonate; acid chlorides such as acetyl chloride, benzoyl chloride, toluyl chloride, and phthalyl chloride; and acid anhydrides such as maleic anhydride and phthalic anhydride; and the like can be mentioned.

In addition, it is possible to use these electron donating compounds singly and independently, or they can be used in combinations of two or more. Esters are preferable and phthalic acid esters are particularly preferable.

In the preparation of the above-mentioned solid catalyst, the amount of the above-mentioned titanium used is a molar ratio preferably within the range of 0.0001~1000, and more preferably within the range of 0.01~100 with respect to the amount of the magnesium compound used. In accordance with need, halogen compounds can be used, but when using halogen compounds, the quantity of halogen compounds is a molar ratio preferably within a range of 0.01~1000 and more preferably within a range of 0.1~100 with respect to the amount of the magnesium compound used, and this does not depend on the presence or absence of halogens contained in the magnesium compound. The quantity of the electron donating compound used is a molar ratio within the range of 0.001~10, and more preferably within the range of 0.01~5, with respect to the amount of the above-mentioned magnesium compound used.

As the manufacturing method for the above-mentioned solid catalyst, conventional known manufacturing methods for solid catalysts can be used in which the magnesium compound, the titanium compound, and the electron donating compound, and, additionally, in accordance with need, assisting agents such as halogen-containing compounds, are brought into contact with each other all at once or in a stepwise manner, reacting them, and thereby obtaining the catalyst.

It is preferable to use a polymerization catalyst component obtained by additionally conducting, on the prepared solid catalyst, one or more treatments with an electron donating compound at a temperature of −30~150° C., and preferably 0~100° C., and two or more treatments with a halogen-containing compound at 0~200° C. and preferably 50~150° C. The amount of the electron donating compound used here is within the range of 0.001~500 times in molar ratio and preferably 0.01~50 times in molar ration with respect to titanium atoms in the solid catalyst. In addition, the amount of the halogen-containing compound used is preferably in the range of 0.01~10000 times in molar ratio, and preferably within the range of 0.1~1000 times in molar ratio with respect to the titanium atoms in the solid catalyst. Generally, the treatments on the solid catalyst by the electron donating compound and the halogen-containing compound are can be carried out in an inactive hydrocarbon medium. In this situation, as the inactive hydrocarbon medium which can be used, aliphatic hydrocarbons such as pentane, hexane, heptane, octane, and decane; aromatic hydrocarbons such as benzene, toluene, and xylene; and the like can be mentioned.

The polymerization method for obtaining the polypropylene which is the starting material for the highly crystalline polypropylene of the present invention is not particularly limited, and known polymerization methods can be used. For example, in addition to liquid phase polymerization methods such as slurry polymerization and bulk polymerization; gas phase polymerization methods can also be used. In addition, methods in which batch polymerization, continuous polymerization and batch type polymerization are conducted can also be used.

The starting material polypropylene preferably has an isotactic pentad index ([mmmm]%) which is an indicator of stereoregularity, of at least 99.3% as measured using nuclear magnetic resonance ($^{13}$C-NMR). The melt flow rate (hereinafter referred to as MFR) is preferably at least 0.1 g/10 minutes, and the Mw/Mn as measured by gel permeation chromatography is preferably at least 2.

The isotactic pentad index which is measured using $^{13}$C-NMR is the isotactic index of the pentad units of methyl group within the polypropylene molecule chain, and their respective signals can be identified based on A. Zambelli et al, Macromolecules, 13, 267 (1980).

The component with comparatively low stereoregularity of the starting material polypropylene polymerized by the above-mentioned method can be removed, and, thereby, it is possible to obtain a more highly crystalline polypropylene. As the method for removing the component having low stereoregularity, a temperature raising elution fractionation method using a column (hereinafter referred to as column fractionation), washing methods using known solvents such as a boiling hexane extraction method, a boiling octane extraction method), a xylene washing method, a room temperature xylene fractionation method, and the like can be mentioned. The highly crystalline polypropylene obtained by these methods preferably has an isotactic pentad index ([mmmm]%) which is an indicator of stereoregularity, of at least 99.5%, more preferably at least 99.6%, and ideally at least 99.8% as measured by means of nuclear magnetic resonance ($^{13}$C-NMR). When the isotactic pentad index is less than 99.5%, the rate of crystallization is too slow, and the quantity of R-lamella decreases, and the degree of crystallinity also does not improve, therefore, the required rigidity and thermal resistance cannot be obtained.

The column fractionation method is carried out, for example, in the following way. The starting material polypropylene is dissolved in para-xylene at 130° C., then, after the addition of Celite, the temperature is lowered to room temperature at a rate of 10° C./minute while stirring, thereby, the starting material polypropylene becomes attached to the Celite. This Celite is charged into a stainless steel column, then para-xylene is run through the column at a constant rate while the temperature is raised in a stepwise manner, and at each temperature, the fraction which is eluted is separated. Here, from among the obtained fractions, by using polypropylene which has an isotactic index of at least 99.5%, it is possible to obtain the highly crystalline polypropylene having a spherulite structure of the present invention.

The washing of the starting material polypropylene using solvent which occurs in the present invention is conducted by means of the following method, but the present invention is not limited to this method.

The starting material polypropylene used in the washing preferably has high stereoregularity, and a high MFR. In addition, the form of the starting material polypropylene is not particularly limited, but a polymerized polypropylene as it is, is preferable.

As the solvent, it is preferable to use a solvent which has a boiling point at below which a part or all of the polypropylene will dissolve such as xylene, decane, orthodichlorobenzene, 1,2,4-trichlorobenzene, and phenyl ether. Solvents for which the starting material polypropylene has a low solubility do not provide satisfactory washing effects and are, therefore, not preferable.

The proportion of solvent used is not particularly limited, but at least 100 parts by weight and less than 10,000 parts by weight with respect to 100 parts by weight of starting material polypropylene is preferable, and at least 200 parts by weight and less than 2,000 parts by weight with respect to 100 parts by weight of starting material polypropylene is more preferable.

The washing temperature can be selected so as to be within a range which does not negatively impact the objects of the present invention, and is different depending on which solvent is used, but a temperature in a range at which a component of 0.1~70% by weight of the total polymer can be removed is preferable. For example, when using xylene, a temperature of at least 10° C. and less than 120° C. is preferable, and a temperature of at least 20° C. and no more than 115° C. is more preferable. When the temperature is less than 10° C., it is not possible to effectively remove the portion having low stereoregularity. When the temperature is at least 120° C., since almost all of the polymer dissolves, after dissolving, separation of the solvent is difficult, and, in addition, it is not possible to obtain a sufficient quantity of the highly crystalline polypropylene. For example, when using a solvent for which the solubility of the polymer is lower than that for xylene, the washing temperature is preferably as high as possible but not within a range which exceeds the melting point of the polymer.

The length of time for washing is not particularly limited, and is selected such that there is sufficient time to remove the component having low stereoregularity. More specifically, at least 1 minute and less than 10 hours, preferably at least 3 minutes and less than 7 hours, and more preferably at least 5 minutes and less than 5 hours, can be selected.

As the apparatus for the washing, a counter-current extractor, a tank fitted with a stirrer, or the like can be used.

After the polypropylene washed using a solvent in the above-mentioned way is separated from the solvent, it is dried, and the highly crystalline polypropylene having a spherulites structure of the present invention can be obtained.

The MFR of the highly crystalline polypropylene of the present invention is preferably at least 0.1 g/10 minutes, preferably at least 0.5 g/10 minutes, and more ideally at least 1.0 g/10 minutes. When the MFR is less than 0.1 g/10 minutes, the flowability is poor and molding processability is inferior.

In addition, it is preferable for the polypropylene of the present invention to have a weight-average molecular weight (Mw) as measured by means of gel permeation chromatography of at least 15,000 and no more than 500,000, and more preferably at least 15,000 and no more than 250,000. The molecular weight distribution which can be calculated in the same way is not particularly restricted, but the ratio Mw/Mn of the weight-average molecular weight and the number-average molecular weight is preferably at least 2. When the Mw/Mn is less than 2, flowability is poor and molding processability is inferior.

The highly crystalline polypropylene of the present invention can be, for example, an $\alpha$-olefin such as ethylene, butene, or the like, which have been copolymerized to an extent which will not negatively impact the objects of the present invention.

The highly crystalline polypropylene of the present invention is one which can achieve the degree of crystallinity required by the objects of the present invention. In addition, the highly crystalline polypropylene of the present invention can take various forms such as powders, pellets, films, sheets, laminates, filaments, tubes, rods, and the like.

In the present invention, the highly crystalline polypropylene of the present invention alone can be molded for uses requiring, in particular, rigidity and heat resistance, but for situations in which a balance of impact strength and rigidity are necessary, it can be used in resin compositions having the following compositions.

The resin compositions of the present invention are (A) a resin composition (hereinafter referred to as resin composition (A)) comprising 100 parts by weight of the above-mentioned highly crystalline polypropylene and no more than 30 parts by weight of a filler;

(B) a resin composition (hereinafter referred to as resin composition (B)) comprising at least 30% by weight of the above-mentioned highly crystalline polypropylene and no more than 70% by weight of a propylene/$\alpha$-olefin block copolymer (hereinafter referred to as HIPP);

(C) a resin composition (hereinafter referred to as resin composition (C)) comprising at least 60% by weight of the above-mentioned highly crystalline polypropylene and no more than 40% of an ethylene-propylene rubber (hereinafter referred to as EPR); or (D) a resin composition (hereinafter referred to as resin composition (D)) comprising 100 parts by weight of a mixture which comprises at least 30% by weight of the above-mentioned highly crystalline polypropylene and no more than 70% by weight of a propylene/$\alpha$-olefin block copolymer (hereinafter referred to as HIPP); and no more than 30 parts by weight of a filler.

For these resin compositions (A)~(D), the method for mixing the highly crystalline polypropylene and the other components is not particularly limited, and known mixing methods can be used to mix all the ingredients using, for example, a ribbon blender, a tumbler, a Henschel mixer, or the like, in addition, methods in which melt-mixing is conducted using, for example, a kneader, a mixing rolls, a Banbury mixer, an extruder, or the like. With regard to the temperature of the melt-mixing, a temperature in the range of 170~300° C. is suitable, a temperature in the range of 190° C.~280° C. is preferable, and a temperature in the range of 200~260° C. is even more preferable. On the other hand, it is also possible to add all of a the components directly to the molder, and to conduct the molding process.

As the filler which is used in the above mentioned resin compositions (A) and (D), it is possible to use organic fillers or inorganic fillers, such as, calcium carbonate, talc, glass fiber, mica, calcium silicate, and the like, but for a balance of impact resistant strength and rigidity, talc is preferable. Talc is also called magnesium silicate, it is used widely as a filler in thermoplastic resins and synthetic rubbers, and it can be manufactured by means of a dry method in which a natural ore is coarsely crushed, and then classified and refined. For example, methods in which talc is used are disclosed in Japanese Patent Application, First Publication, No. Sho 53-79938, Japanese Patent Application, First Publication, No. Sho 55-120642, and Japanese Patent Application, First Publication, No. Sho 56-141341.

With regard to the average particle size of the talc, average particle size of talc means the measurement value of the particle diameter which corresponds to 50% by weight of the accumulated amount of the particle size accumulation distribution curve which is measured by means of light penetration method using a measurement device such as a particle size distribution meter SA-CP3L manufactured by Shimadzu Corporation, or by means of the liquid phase dispersion precipitation method as recited in JIS Z8820 or JIS Z8822. The average particle size of the talc, as measured in this way, is less than 5 $\mu$m, preferable 0.3~3.0 $\mu$m, and more preferably 0.4~2.8 $\mu$m.

When the average particle size is 5 $\mu$m or greater, impact resistance is degraded, and this is not preferable.

This type of talc can be used untreated. However, in order to improve the rigidity and impact strength, and the like, by improving the adhesive strength and the dispersability of the talc for the resin component of the polyolefin type resin composition of the present invention, it is also possible to use a talc which has been treated by various organic titanate-type coupling agents, silane-type coupling agents, aluminum-type coupling agents, aliphatic acids, aliphatic acid metal salts, fatty acid esters and the like.

In addition to the compositions of the present invention, it is also possible to use a graft modified polypropylene obtained by treating a polypropylene with organic peroxides together with an unsaturated carboxylic acid, representatives of which are maleic anhydride, acrylic acid, and itaconic acid.

The HIPP used in the above-mentioned resin compositions (B) and (D) is a block copolymer of a propylene and one type, or two or more types, of $\alpha$-olefin having 2~8 carbons (but excluding those having 3 carbon atoms); a block-copolymer of propylene and ethylene; a block copolymer of propylene and ethylene, a block copolymer of propylene, ethylene, and butene-1 or hexene-1; or the like; which has been polymerized by using a Ziegler-Natta catalyst, and which normally contains 0.5~15% by weight of α-olefin, and the amount of copolymer is 5~40% by weight.

An HIPP as above having an MFR of at least 0.1~70 g/10 minutes, and preferably 0.5~60 g/10 minutes can be used. When the MFR is less than 0.1 g/10 minutes, flowability is poor, and molding is difficult. In addition, when the MFR exceeds 70 g/10 minutes, the strength of the impact resistance is weakened, and this is unsuitable. Adjusting these MFRs by thermal decomposition of the polymerized copolymer together with an organic peroxide is also possible.

In addition, the propylene-ethylene block copolymer (hereinafter referred to as BPP) which is preferably used as the above-mentioned HIPP can be obtained using a known multistage polymerization method. More specifically, a method can be used in which propylene is polymerized in a first-stage reactor, then, propylene and ethylene are copolymerized in a second stage reactor. This is a generally well known technique and this production method is described in a large number of publications. (For example, it is described in Japanese Patent Application, Second Publication, No. Sho 36-15284; Japanese Patent Application, Second Publication, No. Sho 38-14834; Japanese Patent Application, First Publication, No. Sho 53-35788; Japanese Patent Application, First Publication, No. Sho 53-35789; and Japanese Patent Application, First Publication, No. Sho 56-55416; and the like.)

The rubber content of the BPP is in the range of 5~40% by weight, preferably 8~35% by weight, and more preferably 10~28%. When the content of the rubber is less than 5% by weight, and it is used in the polyolefin type resin composition of the present invention is used, impact resistance is not satisfactory, and this is not desirable. On the other hand, when the content of the rubber exceeds 40% by weight, rigidity and heat resistance are degraded, and this is not desirable.

In addition, it is necessary for the propylene content of the rubber component present in the BPP to be in the range of 30~65% by weight. It is preferably, in the range of 33~63% by weight and it is more preferably in the range of 35~60% by weight. When the propylene content in the rubber component is less than 30% by weight, and it is used in the polyolefin type resin composition of the present invention, it causes the appearance of the molded product to become noticeably marred, therefore, this is not desirable. On the other hand, when the propylene content in the rubber component exceeds 65% by weight, the low crystalline component is included, and this causes the rigidity to be degraded, the heat resistance to be degraded, and stickiness of the surface of the molded product, therefore, this is not preferable.

Other factors are not particularly limited, but with regard to the propylene polymer of the BPP obtained at the first stage, there are substantial homopolymers of propylene, and copolymers of propylene and ethylene, and α-olefins having 4~12 carbons; but as the propylene polymer used in the polyolefin type resin composition of the present invention, substantial homopolymers of propylene are preferable from the point of view of rigidity and heat resistance.

The EPR used in the above-mentioned resin composition (C) is not particularly limited, but an EPR having an MFR, measured in accordance with Condition 14 of Table 1 of JIS K7210, of 0.1~5 (g/10 minutes), and preferably 0.5~4 (g/10 minutes), and having a propylene content of 15~55% by weight, and preferable 20~50% by weight, is preferable from the point of view of a superior balance of the properties of rigidity, impact resistance, and heat resistance.

Moreover, the EPR of component (C) may be an ethylene-propylene-unconjugated diene rubber (EPDM) which comprises a third component such as ethylidene norbornane, di-cylcopentadiene, 1,4-hexadiene, cyclooctadiene, and methylene norbornane. In addition, it is also possible to use EPR and EPDM as a mixture.

The proportion of each of the components used in the above-mentioned polyolefin type resin composition of the present invention is as follows.

In resin composition (A), there are 100 parts by weight of highly crystalline polypropylene, and there are no more than 30 parts by weight of a filler. When the filler exceeds 30 part by weight, the strength of the impact resistance is degraded, the mold becomes contaminated due to the occurrence of bleeding out, and so on, therefore this situation is not desirable.

In resin composition (B), there is at least 30% by weight of highly crystalline polypropylene and no more than 70% by weight of HIPP. When the quantity of highly crystalline polypropylene is less than 30% by weight, the improvement in rigidity is small, and the balance of rigidity and the strength of impact resistance is degraded.

In resin composition (C), there is at least 60% by weight of highly crystalline polypropylene and no more than 40% of EPR. Impact resistance is improved by the addition of a quantity of EPR in this range. When the quantity of EPR exceeds 40% by weight, the rigidity and heat resistance deteriorate.

In resin composition (D), there are 100 parts by weight of a mixture of 30% by weight of highly crystalline polypropylene and no more than 70% by weight of a HIPP, and there are no more than 30 parts by weight of a filler.

To the highly crystalline polypropylene or to the resin compositions (A)~(D) of the present invention, in accordance with need, it is possible to add know crystal nucleating agents to improve the degree of crystallinity, examples of know crystal nucleating agents are sodium benzoate, p-t-butyl aluminum benzoate, sodium bis(4-t-butylphenyl) phosphate, dibenzylidene sorbitol, bis(p-methylbenzylidene) sorbitol, bis(p-ethylenebenzylidene) sorbitol, sodium -2,2'-methylene-bis(4,6-di-t-butylphenyl) phosphate, sodium-2,2'-ethylidene-bis(4,6-di-t-butylphenyl) phosphate, lithium-2,2'-methylene-bis(4,6-di-t-butylphenyl) phosphate, lithium-2,2'-ethylidene-bis(4,6-di-t-butylphenyl) phosphate, sodium-2,2'-ethlyidene-bis-(4-i-propyl-6-t-butylphenyl) phosphate, lithium-2,2'-methylene-bis-(4-methyl-6-t-butylphenyl) phosphate, lithium-2,2'-methylene-bis-(4-ethyl-6-t-butylphenyl) phosphate, calcium-bis-[2,2'-thiobis(4-methyl-6-butylphenyl) phosphate], calcium-bis-[2,2'-thiobis(4-ethyl-6-butylphenyl) phosphate], calcium-bis-[2,2'-thiobis(4,6-di-butylphenyl) phosphate], magnesium-bis-[2,2'-thiobis(4,6-di-t-butylphenyl) phosphate], magnesium-bis-[2,2'-thiobis(4-t-octylphenyl) phosphate], sodium-2,2'-butylidene-bis(4,6'-di-methylphenyl) phosphate, sodium-2,2'-butylidene-bis(4,6-di-t-butylphenyl) phosphate, sodium-2,2'-octylmethylene-bis(4,6-di-t-butylphenyl) phosphate, sodium-2,2'-t-octylmethylene-bis(4,6-di-t-butylphenyl) phosphate, calcium-bis-[2,2'-methylene-bis(4,6-di-t-butylphenyl) phosphate], magnesium-bis-[2,2'-methylene-bis(4,6-di-t-butylphenyl)phosphate], barium-bis[2,2'-methylene-bis(4,6-di-t-butylphenyl) phosphate], sodium-2,2'-methylene-bis(4-methyl-6-t-butylphenyl) phosphate], sodium-2,2'-methylene-bis(4-ethyl-6-t-butylphenyl) phosphate], sodium-(4,4'-dimethyl-5,6'-di-t-butyl-2,2'-biphenyl) phosphate], calcium-bis-[(4,4'-dimethyl-6,6'-di-t-butyl-2,2'-biphenyl) phosphate], sodium-2,2'-ethylidene-bis-(4-m- butyl-6-t-butylphenyl) phosphate, sodium-2,2'-methylene-bis(4,6-di-methylphenyl) phosphate, sodium-2,2'-methylene-bis(4,6-di-ethylphenyl) phosphate, potasium-2,2'-ethylidene-bis(4,6-di-t-butylphenyl) phosphate, calcium-2,2-ethylidene-bis(4,6-di-t-butylphenyl) phosphate, magnesium-bis[2,2'-ethylidene-bis(4,6-di-t-butylphenyl) phosphate, barium-bis-[2,2'-ethylidene-bis(4,6-di-t-butylphenyl) phosphate, aluminum-tris-[2,2'-methylidene-bis-(4,6-di-t-butylphenyl) phosphate, aluminum-tris-[2,2'-ethylidene-bis-(4,6-di-t-butylphenyl) phosphate, and the like. Moreover these crystal nucleating agents may be used individually or in combinations of two or more. In particular, from among these examples, sodium-2,2'-methylene-bis(4,6-di-t-butylphenyl) phosphate, sodium-2,2'-ethylidene-bis(4,6-di-t-butylphenyl) phosphate, and the like are preferable.

The amount of these crystal nucleating agents added is, with respect to 100 parts by weight of the above-mentioned highly crystalline polypropylene or resin compositions (A)~(D), in the range of 0.05~0.4 parts by weight, preferably in the range of 0.08~0.3 parts by weight, and more preferably in the range of 0.1~0.2 parts by weight. When the amount of nucleating agent is less than 0.05 parts by weight, improvements in rigidity, and heat resistance are poor, therefore, this is not preferable. When the amount of the nucleating agent exceeds 0.4 parts by weight, improvements reach saturation, and costs increase.

To the highly crystalline polypropylene or resin compositions (A)~(D) of the present invention, it is possible to add thermoplastic resins; various additives, such as anti-oxidizing agents, thermostabilizing agents, photostabilizing agents, weatherproofing stabilizing agents, anti-static agents, anti-clouding agents, flame retardants, plasticizing agents, mold releasing agents, foaming agents, lubricants, blocking preventing agents, dyes, pigments, coloring agents, and fragrances, and the like, which are generally used in polypropylenes, provided they are used in quantities which do not have a negative impact on the objectives of the present invention.

The highly crystalline polypropylene and resin compositions (A)~(D) of the present invention can be molded into a desired shape using a molding or forming method, such as an injection molding method, a film forming method, a sheet forming method, a blow molding method, an extrusion molding method, compression molding method, a laminate forming method, and a fiber forming method, which is generally practiced in the field of synthetic resins.

For example, in the case of an injection molding method, if a method which is generally used in injection molding ordinary thermoplastic resins is used there are no particular limitations, and it is possible to conduct the injection molding by heating the resin within a heating cylinder, and when the resin has melted and flows readily, it is charged into the prescribed mold under pressure, and allowed to cool and harden within the mold. In particular, it is preferable for the molding method to use a molder such as a plunger type injection molding machine, a screw preplasticating injection molding machine, an inline screw injection molding machine, and a vent type injection molding machine, because they provide superior dimensional accuracy, they have a short molding cycle, and they are suitable for large scale production of molded articles which have complex shapes.

At this time, in order to increase the improvements in rigidity of the injection molded products, it is preferable to raise the temperature of the mold, thereby, the rate at which the resin cools is slowed, and the degree of crystallinity is increased. The mold temperature is preferably 20~80° C., and more preferably 40~80° C.

In the following, Examples are given and the present invention is explained in more detail. Each of the measurements used in the Examples are made using the following methods.

1. Stereoregularity:

The isotacticity is evaluated by [mmmm]% by means of $^{13}$C-NMR. [mmmm]% is the isotactic index of the pentad unit within the polypropylene molecule chain. The measurement is made using a JNM-GSX400 manufactured by JEOL Ltd. The absorption assignment determination method is carried out based on Macromolecules, 13, 267 (1980).

2. Molecular Weight and Molecular Weight Dispersion:

These are measured by means of gel permeation chromatography (GPC). The GPC used 150C manufactured by Waters Co. Ltd., Shodex HT806M (2 columns) manufactured by Showa Denko kk were used in the column, and 1,2,4-trichlorobenzene was used as the solvent. The calibration curve was prepared using a commercially available monodispersion polystyrene, and was evaluated by conversion to the viscosity of the polypropylene.

3. Heat of Fusion According to DSC (Differential scanning Calorimeter)

This was measured in conformity with JIS K7122 under a nitrogen atmosphere using a DSC7 manufactured by Perkin Elmer Co. Ltd. The temperature calibration was conducted using indium and lead which are standard reference materials. In the measurement of the melting temperature (Tmp), the rate of temperature increase was 10° C./minute, and the heat of fusion (ΔHm) was calculated using, as the base line, a straight line connecting the end of the peak of the endothermic curve of melting and a point which was determined by subtracting 65° C. from the final temperature. The degree of crystallinity is calculated by dividing ΔHm by the heat of fusion of a perfect crystal of polypropylene which is 209 J/g.

4. Birefringence:

The retardation (R) was measured using a polarizing microscope to which a Berek compensator had been fitted, and the birefringence calculated by dividing R by the thickness of the sample. The birefringence according to the retardation (R) was calculated in compliance with the method recited in New Experimental Chemistry Lectures, Macromolecule Chemistry II, (1978) 831~836.

5. MFR:

The melt flow rate was measure according to JIS-K6758 (230° C.).

6. Modulus of elasticity According to an Ultrasonic Method:

This was measured based on the Nagata et al, Japanese Journal of Applied Physics, 19, 985 (1980). The sound velocity v can be calculated from the delay $t_x$ of the pulse of the reflected waves which do not pass through a sample and the penetrating waves which do pass through a sample, and the thickness of a sample 1, using the following formula (III).

$$v = 1/t_x \qquad \text{Formula (III)}$$

The modulus of elasticity (M) is calculated from the vertical sound wave velocity $v_e$ which is normally measured and the density of the sample ρ using the following Formula (IV).

$$M = \rho v_e^2 \qquad \text{Formula (IV)}$$

7. Density:

Density is measured using a density gradient pipe in compliance with JIS-k7112.

8. Rate of Spherulite Growth:

This is measured using a polarizing microscope to which a Hot Stage FP82 manufactured Mettler Co. Ltd. In detail, a 15 µm thick film is held between slide glasses, and melted at 230° C. under a nitrogen atmosphere for 5 minutes, then the temperature is lowered to the prescribed crystallization temperature at a cooling rate of 20° C./minute, and the linear growth rate of the growing crystals per unit of time is measured.

9. Tensile Yield Strength:

This was measured in accordance with JIS K6758.

10. Tensile Elongation at Break

This was measured in accordance with JIS K6758.

11. Flexural Strength:

This was measured in accordance with JIS K6758.

12. Flexural Modulus:

This was measured in accordance with JIS 6758.

13. Izod Impact Strength:

This was measured in accordance with JIS 6758.

14. Heat Distortion Temperature:

This was measured in accordance with JIS 7207.

15. Scratch Resistance:

This was shown by a pencil scratch value.

16. Contraction Rate (Dimensional Change of the Molded Article):

Using an injection molder (IS170F2) manufactured by Toshiba, a test piece of 120 mm in width, 120 mm in length and 2 mm in thickness was cut out from a panel manufactured using an injection molder at 230° C., an injection rate of 25 mm/minute, and an injection time of 30 seconds. This test piece was left for forty eight hours in a temperature maintained room at 23° C. and 50% humidity, then the α mm dimension of the resin fluidity direction (referred to as the MD direction), the β mm dimension of the direction perpendicular to the resin fluid direction (referred to as the TD direction), and the contraction of the molded article was calculated using the following formulas.

contraction rate (%) in the MD direction=100 $(\gamma-\alpha)/\gamma$ contraction rate (%) in the TD direction=100 $(\gamma-\beta)/\gamma$.

Here γ represents the original dimensions of the mold.

17. Coefficient of Linear Expansion:

This was measured in accordance with ASTM-D696 at a range between 30° C. to 60° C.

18. Low Odor Production at Time of Molding

The odor produced at the time of injection molding the test piece prepared for the flexural modulus evaluation was evaluated using the following four levels.

◎ No Odor

○ Almost No Odor

Δ Odor Present

X Strong Odor

[Example 1]

Manufacture of the Olefin Polymerization Catalyst Component

1. Preparation of the Solid Catalyst

Under a nitrogen atmosphere, 47.6 g (500 mmol) of anhydrous magnesium chloride, 250 ml of decane, and 234 ml (1.5 mol) of 2-ethylhexyl alcohol were heat-reacted for 2 hours at 130° C. to form a uniform solution, then 11.1 g (75 mmol) of phthalate anhydride were added to this solution, the solution was mixed by stirring for another hour at 130° C. to dissolve the phthalic anhydride into the uniform solution. After the obtained uniform solution was cooled to room temperature, the total volume was dripped into 2.0 1 (18 mol) of titanium tetrachloride maintained at −20° C., over a period of 1 hour. When this dripping was completed, the temperature of the mixed solution was raised to 110° C. over a period of 4 hours, and when the temperature reached 110° C., 26.8 ml (125 mmol) of diisobutyl phthalate was added, and allowed to react for two hours at 110° C. while stirring. When the reaction was completed, the solid portion was extracted by filtration while hot. After that, this reaction product was suspended in 2.0 1 (18 mmol) of titanium tetrachloride, and reacted for 2 hours at 110° C. After completion of the reaction, the solid portion was extracted by a second filtration while hot, then it was washed seven times in 2.0 l of decane at 110° C., and three times in 2.0 l of hexane at room temperature. The titanium content of the obtained solid catalyst was measured, and found to be 2.57% by weight.

2. Treatment Using an Electron Donating Compound and a Halogen-Containing Compound 40 g of the solid catalyst obtained by means of the above-described method were suspended in 600 ml of toluene, and reacted with 11.9 g (43 mmol) of diisobutyl phthalate at 25° C. for 1 hour. After the reaction was completed, 200 ml (1.8 mol) of titanium tetrachloride were added and allowed to react for 2 hours. After the reaction was completed, the solid portion was extracted by filtration while hot. Then the reaction product was suspended in 200 ml (1.8 mol) of titanium chloride, and reacted for 2 hours at 110° C. After the reaction was completed, the solid portion was extracted by a second filtration while hot, and washed seven times in 1.0 l of decane at 110° C., and three times in 1.0 l of hexane at room temperature. The titanium content of the obtained solid catalyst was measured, and found to be 2.23% by weight.

(Polymerization of the Propylene)

Under a nitrogen atmosphere, 200 mg of the solid catalyst component prepared by means of the above-described method, 11.4 g (100 mmol) of triethyl aluminum, and 30 mmol of dicyclopentyl dimethoxysilane were put into an autoclave fitted with a stirrer and having a capacity of 60 l. Next, 18 kg of propylene and a quantity of hydrogen such that there was 0.26% by mol of hydrogen with respect to the propylene were introduced, the temperature was raised to 70° C., and polymerization allowed to occur for 1 hour. After 1 hour, the unreacted propylene was removed, and the polymerization terminated.

(Column Fractionation)

Temperature raising elution column fractionation was carried out using this polypropylene. At this time, the polypropylene used in the fractionation had a [mmmm]% of 99.4, and an MFR of 33.5g/10 minutes. 1.2 g of Irganox 1010 manufacture by Ciba Geigi, as an anti-oxidant, and 1 g of polypropylene were dissolved into 600 ml of para-xylene by stirring for 30 minutes at 130° C. under a nitrogen atmosphere. Then, 70 g of Celite 545 (manufactured by Celite Co. Ltd.) from which the particles which floated in water had been removed were added as a carrier for adhesion of the polypropylene, and the mixture stirred again for 30 minutes. After that, the temperature was lowered to room temperature at a cooling rate of 10° C./minute while stirring, and the polypropylene allowed to adhere to the Celite. A stainless steel column was filled with Celite to which polypropylene had adhered, then the column was put into an oil bath, and para-xylene to which 0.2 parts by weight of Irganox 1010 was run through the column at a rate of 200 ml/hour while the temperature was raised in a stepwise manner from room temperature to 130° C. and, thereby, fractionation conducted. From among the obtained fractions, a polypropylene having a [mmmm]% of 99.8% and a molecular weight of 137000 was obtained.

With respect to 100 parts by weight of the above-mentioned fraction, 0.15 parts by weight of Irgafos 168 and 0.10 parts by weight of Irganox 1010, manufactured by Ciba Geigi, were dissolved in 10 ml of acetone as anti-oxidants, then the polypropylene was impregnated with this acetone solution, and then the acetone was added by means of air drying at room temperature.

(DSC Measurement)

Samples for the purpose of DSC measurement and polarizing microscope observation were prepared by means of a press molding method, the samples were films of 100 μm and 15 μm respectively. The press molding was carried out by melting at 230° C. for 5 minutes, then applying pressure of 100 kg/cm² maintained for 5 minutes at a temperature of 230° C., and then cooling for 5 minutes at 30° C.

DSC measurement was carried out according to the following method. After melting a sample of 100 μm in thickness at 230° C. for 5 minutes under a nitrogen atmosphere, the sample was cooled to 132° C. at a cooling rate of 100° C./minute, maintained for 90 minutes and allowed to crystallize, then at the same rate, the sample was cooled to 30° C. Next, the sample was maintained at 30° C. for 5 minutes, then the temperature raised to 230° C. at 10° C./minute, the melting temperature (Tmp) and the heat of fusion (ΔHm) were measured, and the degree of crystallinity calculated. The obtained results are shown in Table 2.

(Measurement of the Proportion of R-lamella f(R) with respect to spherulites)

The preparation of the sample for polarizing microscope observation was carried out according to the following method. A film of 15 μm in thickness film was held between a slide glass and a cover glass, and melted at 230° C. for 5 minutes under a nitrogen atmosphere using a Hot Stage FP82 manufactured by Mettler Co. Ltd., then, after being cooled to 132° C. at a cooling rate of 20° C./minute, it was maintained for 90 minutes, and allowed to crystallize. After that, it was left to cool at room temperature. After confirming that the entire surface area of this crystallized film was filled with spherulites using a polarizing light microscope, a Berek Compensator was attached, the birefringence measured, and the proportion of R-lamella calculated using the following Formula (I).

$$f(R)=(-\Delta n+0.0351)\times 100/0.0528 \qquad \text{Formula (I)}$$

Here, Δn is the birefringence, and f(R) is the proportion of R-lamella.

In addition, density was measured using a sample having a thickness of 1 mm crystallized using the same method described above, and then the modulus of elasticity was measured using an ultrasonic method.

The results of the spherulite growth rate during crystallization, the birefringence, the proportion of R-lamella, the modulus of elasticity, and the scratch resistance obtained in the above-mentioned ways are shown together in Table 2.

In addition, the proportion of R-lamella f(R) and the weight-average molecular weight Mw for the obtained polypropylene satisfy the following Formula (II) as shown in FIG. 2.

$$f(R)>-2.5\times(\log\{Mw\}-4)^2+88.9 \qquad \text{Formula (II)}$$

[Example 2]

With regard to the same highly crystalline polypropylene as Example 1, the DSC measurement was conducted in the following manner. In detail, after a film was prepared in the same way as in Example 1, a sample of 100 μm in thickness was melted at 230° C. for 5 minutes under a nitrogen atmosphere, the sample was cooled to 150° C. at a cooling rate of 100° C./minute, maintained for 72 hours and allowed to crystallize, then at the same rate, the sample was cooled to 30° C. The sample was maintained at 30° C. for 5 minutes, then the temperature raised to 230° C. at 10° C./minute, the melting temperature (Tmp) and the heat of fusion (ΔHm) were measured. The degree of crystallinity was calculated by dividing the heat of fusion measured using this method by the theoretical heat of fusion, 209 J/g, of the perfect polypropylene crystal. The result was a melting point (Tmp) of 178.2° C., a heat of fusion (ΔHm) of 145.2 J/g, and a degree of crystallinity of 69.5%.

Furthermore, for the same highly crystalline polypropylene as Example 1, the birefringence was measured in the following way. In detail, a film of 15 μm in thickness film was held between a slide glass and a cover glass, and melted at 230° C. for 5 minutes under a nitrogen atmosphere using a Hot stage FP82 manufactured by Mettler Co. Ltd., then, after being cooled to 150° C. at a cooling rate of 20° C./minute, it was maintained for 72 hours, and allowed to crystallize. After that, it was left to cool at room temperature. After confirming that the entire surface of this crystallized film was filled with spherulites using a polarizing light microscope, a Berek Compensator was attached, the birefringence measured, and the proportion of R-lamella was calculated from the birefringence measured in this way using the Formula (I).

In addition, density was measured using a sample having a thickness of 1 mm crystallized using the same method described above, and then the modulus of elasticity was measured using an ultrasonic method. The results were a spherulite growth rate measured using the above-described method of 0.6 μm/minute, a birefringence of −0.0177, a proportion of R-lamella of 99.9%, and a modulus of elasticity measured by means of an ultrasonic method of 1.301× 10⁸ MPa.

[Example 3]

Using a polypropylene having [mmmm]% of 99.4 and an MFR of 7 g/10 minutes which was obtained by polymerization according to the same method as Example 1, temperature raising elution column fractionation was conducted and, thereby, a polypropylene was obtained which had [mmmm]% of 99.6, a Mw of 130,000, and a Mw/Mn of 2.1 (Table 1).

The polypropylene was evaluated using the same methods as in Example 1. The results for the spherulite growth rate during crystallization, the melting temperature (Tmp), the heat of fusion (ΔHm), the degree of crystallinity, the birefringence, the proportion of R-lamella, the modulus of elasticity, and the scratch resistance obtained in the above-mentioned ways are shown together in Table 2.

In addition, the relationship between the proportion of R-lamella f(R) and the weight-average molecular weight Mw for the obtained polypropylene satisfies the following Formula (II) as shown in FIG. 2.

$$f(R) > -2.5 \times (\log\{Mw\} - 4)^2 + 88.9 \qquad \text{Formula (II)}$$

[Comparative Example 1]

A polypropylene having a [mmmm]% of 98.9, a Mw of 117,000, and a Mw/Mn of 2.6 (Table 1) was obtained from among fractions obtained by fractionation using J-ALLOMER X2MA810B (MFR=30 g/minute), manufactured by Japan Polyolefins, in the column fractionation. This polypropylene was evaluated using the same methods as in Example 1. The results for the spherulite growth rate during crystallization, the melting temperature (Tmp), the heat of fusion (ΔHm), the degree of crystallinity, the birefringence, the proportion of R-lamella, the modulus of elasticity, and scratch resistance obtained in the above-mentioned ways are shown together in Table 2.

In addition, for the obtained polypropylene, the proportion of R-lamella of the spherulites obtained by means of crystallization under the same conditions as in Example 2 was 90%.

The relationship between the proportion of R-lamella f(R) and the weight-average molecular weight Mw for the obtained polypropylene was a relationship of $$f(R) < -2.5 \times (\log\{Mw\} - 4)^2 + 88.9$$

and did not satisfy the relationship of Formula (II), as shown in FIG. 2.

[Example 4]

A polypropylene having [mmmm]% of 99.4 and an MFR of 168 g/10 minutes which was obtained by polymerization using the same method as Example 1 was used in the column fractionation, and, from the fractions thus obtained, a polypropylene was obtained which had [mmmm]% of 99.7, and Mw of 35,000, and a Mw/Mn of 2.2 (Table 1).

This polypropylene was evaluated using the same methods as in Example 1. The results for the spherulite growth rate during crystallization, the melting temperature (Tmp), the heat of fusion (ΔHm), the degree of crystallinity, the birefringence, the proportion of R-lamella, the modulus of elasticity, and scratch resistance obtained in the above-mentioned ways are shown together in Table 2.

In addition, the relationship between the proportion of R-lamella f(R) and the weight-average molecular weight Mw for the obtained polypropylene satisfies the following Formula (II) as shown in FIG. 2.

$$f(R) > -2.5 \times (\log\{Mw\} - 4)^2 + 88.9 \qquad \text{Formula (II)}$$

[Comparative Example 2]

A polypropylene having a [mmmm]% of 99.6, a Mw of 456,000, and a Mw/Mn of 2.3 (Table 1) was obtained from among fractions obtained by fractionation using J-ALLOMER X2MA421B (MFR=7.5 g/10 minute) in the column fractionation.

This polypropylene was evaluated using the same methods as in Example 1. The results of the spherulite growth rate during crystallization, the melting temperature (Tmp), the heat of fusion (ΔHm), the degree of crystallinity, the birefringence, the proportion of R-lamella, the modulus of elasticity, and scratch resistance obtained in the above-mentioned ways are shown together in Table 2.

The relationship between the proportion of R-lamella f(R) and the weight-average molecular weight Mw for the obtained polypropylene was a relationship of $$f(R) < -2.5 \times (\log\{Mw\} - 4)2 + 88.9$$

and did not satisfy the relationship of Formula (II), as shown in FIG. 2.

TABLE 1

|  | [mmmm] % | Mw × 10³ | Mw/Mn |
|---|---|---|---|
| Example 1 | 99.8 | 137 | 2.4 |
| Example 3 | 99.6 | 130 | 2.1 |
| Example 4 | 99.7 | 35 | 2.2 |
| Comparative Example 1 | 98.9 | 117 | 2.6 |
| Comparative Example 2 | 99.6 | 456 | 2.3 |

TABLE 2

|  | Tmp (° C.) | ΔHm (J/g) | Degree of Crystallinity (%) | Spherulite Crystal Growth (μm/minute) | Birefringence | Proportion of R-lamella (%) | Modulus of Elasticity according to an ultrasonic method (MPa) | Scratch Resistance |
|---|---|---|---|---|---|---|---|---|
| Example 1 | 164.4 | 115.7 | 55.4 | 5.2 | −0.0128 | 90.7 | 8.614 × 10⁷ | 3H |
| Example 3 | 164.2 | 114.0 | 54.5 | 5.1 | −0.0110 | 87.3 | 8.555 × 10⁷ | 3H |
| Example 4 | 160.7 | 125.9 | 60.2 | 7.4 | −0.0127 | 90.6 | 1.003 × 10⁸ | 3H |
| Comparative Example 1 | 162.0 | 111.7 | 53.4 | 4.2 | −0.0065 | 78.8 | 8.083 × 10⁷ | H |
| Comparative Example 2 | 166.0 | 105.3 | 50.4 | 3.6 | −0.0078 | 81.2 | 7.493 × 10⁷ | H |

From the results shown in Table 2, compared with the polypropylenes obtained in Comparative Examples 1 and 2, it is clear that the polypropylenes obtained in the Examples have higher degrees of crystallinity, proportions of R-lamella, heats of fusion, and moduli of elasticity, and are superior in mechanical and thermal properties.

In addition, from the results of Example 2 and Comparative Example 1, it is clear that it is possible to obtain a polypropylene having a high degree of crystallinity and a high proportion of R-lamella, by means of conducting the crystallization at a high temperature.

[Example 5]

(Preparation of the Olefin Polymerization Catalyst Component)

This was conducted in the same way as in Example 1.

(Washing of the Polypropylene)

Using this polypropylene, washing was conducted using xylene. The polypropylene used here had a [mmmm]% of 99.4, an MFR of 33.5 g/minutes and a Mw/Mn of 4.6. 12 L of xylene manufactured by Wako Pure Chemical Industries Ltd. and 4 kg of spherulical polypropylene, having a diameter of no more than approximately 5 mm and in the condition in which it was when it was obtained from the polymerization, were put into a 20 L container which is fitted with a stirrer and substituted with nitrogen, and stirred for 1 hour at 105° C. The washed polypropylene was separated from the solvent by means of filtration, then it was vacuum dried for 24 hours at 70° C., thereby, a polypropylene having a [mmmm]% of 99.6, an MFR of 28.5 g/10 minutes and a Mw/Mn of 4.1 (Table 3) was obtained. As anti-oxidants, each of 3 g of Irganox 1010 and 4.5 g Irgafos 168 were added to 3 kg of this polypropylene and then they were kneaded at a resin temperature of 230° C. using twin screw extruder KTX-37 manufactured by Kobe Steel KK, and pelletized.

(Injection Molding)

The pelletized polypropylene was made into test specimens of 6.4 mm in thickness using an injection molder IS-170 FII manufactured by Toshiba Machines kk, at a temperature of 220° C. and a mold cooling temperature of 50° C. The obtained test specimen was left for 2 days in a temperature maintained room at 23° C. and a relative humidity of 50%, then, the flexural modulus, HDT, and linear expansion coefficient were measured, and scratch resistance examined. These results are shown in Table 5. In addition, the measurement value of the contraction ratio measured by the above-described method and the low odor production at time of injection molding are also shown together in Table 5.

The measurement results of the spherulite growth rate during crystallization, the birefringence, and the proportion of R-lamella, which were evaluated using the same method as in Example 1, are shown in Table 4. The tensile yield strength, the tensile elongation at break, the flexural strength, the flexural modulus, the Izod impact strength, and the heat distortion temperature are shown in Table 8.

In addition, the relationship between the proportion f(R) of R-lamella and the weight-average molecular weight Mw for the obtained polypropylene satisfies the following Formula (II) as shown in FIG. 2.

$$f(R) > -2.5 \times (\log\{Mw\}-4)^2 + 88.9 \quad \text{Formula (II)}$$

[Comparative Example 3]

A polypropylene having a [mmmm]% of 99.4, an MFR of 34.0, and a Mw/Mn of 4.6 was obtained by conducting the same operations as in Example 5 except that the washing temperature was 60° C. (Table 3).

This polypropylene was evaluated using the same methods as in Example 5. The measured results for the spherulite growth rate during crystallization, the melting temperature (Tmp), the heat of fusion (ΔHm), the degree of crystallinity, the birefringence, and the proportion of R-lamella are shown together in Table 4. The flexural modulus, the HDT, scratch resistance, the linear expansion coefficient, the contraction ratio, and the low odor production at the time of molding are shown in Table 5.

In addition, the tensile yield strength, the tensile elongation at break, the flexural strength, the flexural modulus, the Izod impact strength, and the heat distortion temperature were measured. The results are shown in Table 8.

The relationship between the proportion of R-lamella f(R) and the weight-average molecular weight Mw for the obtained polypropylene was a relationship of $$f(R) < -2.5 \times (\log\{Mw\}-4)^2 + 88.9$$

and this does not satisfy the relationship of Formula (II), as shown in FIG. 2.

[Comparative Example 4]

Using a polypropylene polymerized in the same way as in Example 5, and with the exception that washing was not conducted, the same operations as in Example 5 were carried out. This polypropylene was evaluated using the same methods as in Example 5. The measured results for the spherulite growth rate during crystallization, the melting temperature (Tmp), the heat of fusion (ΔHm), the degree of crystallinity, the birefringence, and the proportion of R-lamella are shown together in Table 4. The flexural modulus, the HDT, scratch resistance, the linear expansion coefficient, the contraction ratio, and the low odor production at the time of molding are shown in Table 5.

The relationship between the proportion of R-lamella f(R) and the weight-average molecular weight Mw for the obtained polypropylene was a relationship of $$f(R) < -2.5 \times (\log\{Mw\}-4)^2 + 88.9$$

and this does not satisfy the relationship of Formula (II), as shown in FIG. 2.

[Example 6]

A polypropylene having a [mmmm]% of 99.4, a MFR of 168 g/10 minutes, and Mw/Mn of 4.6 which was polymerized using the same method as in Example 1 was washed using the same method as used in Example 5 with the exception that the washing temperature was 90° C., thereby a polypropylene having a [mmmm]% of 99.5, a MFR of 95.8, and Mw/Mn of 4.2 was obtained (Table 3).

This polypropylene was evaluated using the same methods as in Example 5. The measured results for the spherulite growth rate during crystallization, the melting temperature (Tmp), the heat of fusion (ΔHm), the degree of crystallinity, the birefringence, and the proportion of R-lamella are shown together in Table 4. The flexural modulus, the HDT, scratch resistance, the linear expansion coefficient, the contraction ratio, and the low odor production at the time of molding are shown in Table 5.

In addition, the relationship between the proportion of R-lamella f(R) and the weight-average molecular weight Mw for the obtained polypropylene satisfies the following Formula (II) as shown in FIG. 2.

$$f(R) > -2.5 \times (\log\{Mw\}-4)^2 + 88.9 \quad \text{Formula (II)}$$

[Comparative Example 5]

J-ALLOMER X2SMA810B-2 (MFR=30 g/minute), manufactured by Japan Polyolefins, was washed using the same method as used in Example 1 and, thereby, a polypropylene having a [mmmm]% of 98.2, an MFR of 25.2, and a Mw/Mn of 4.7 (Table 3) was obtained.

This polypropylene was evaluated using the same methods as in Example 5. The measured results for the spherulite growth rate during crystallization, the melting temperature (Tmp), the heat of fusion (ΔHm), the degree of crystallinity, the birefringence, and the proportion of R-lamella are shown in Table 4. The flexural modulus, the HDT, the scratch resistance, the linear expansion coefficient, the contraction ratio, and the low odor production at the time of molding are shown in Table 5.

The relationship between the proportion of R-lamella f(R) and the weight-average molecular weight Mw for the obtained polypropylene was a relationship of $$f(R) < -2.5 \times (\log\{Mw\}-4)^2 + 88.9$$

and this does not satisfy the relationship of Formula (II), as shown in FIG. 2.

TABLE 3

| | Washing Solvent | Washing Temperature (° C.) | Washing Time (hr.) | [mmmm] (%) | MFR (g/10 min) | Mw/Mn |
|---|---|---|---|---|---|---|
| Example 5 | xylene | 105 | 1 | 99.6 | 28.5 | 4.1 |
| Comparative Example 3 | xylene | 60 | 1 | 99.4 | 34.0 | 4.6 |
| Comparative Example 4 | none | none | none | 99.4 | 33.5 | 4.6 |
| Example 6 | xylene | 90 | 1 | 99.5 | 95.8 | 4.2 |
| Comparative Example 5 | xylene | 105 | 1 | 98.2 | 25.2 | 4.7 |

TABLE 4

| | Tmp (° C.) | ΔHm (J/g) | Degree of Crystallinity (%) | Spherulite Crystal Growth (μm/minute) | Birefringence | Proportion of R-lamella (%) |
|---|---|---|---|---|---|---|
| Example 5 | 165.5 | 114.1 | 54.6 | 4.5 | −0.0098 | 85 |
| Comparative Example 3 | 165.2 | 111.6 | 53.4 | 4.2 | −0.0071 | 80 |
| Comparative Example 4 | 165.1 | 111.7 | 53.4 | 4.2 | −0.0072 | 80 |
| Example 6 | 164.0 | 115.4 | 55.5 | 5.2 | −0.0103 | 86 |
| Comparative Example 5 | 162.6 | 107.7 | 50.1 | 3.3 | 0.0013 | 64 |

TABLE 5

| | Flexural Modulus (MPa) | HDT (° C.) | Scratch Resistance | Linear Expansion Coefficient | Contraction Ratio MD (%) | Contraction Ratio TD (%) | Low Odor Production During Molding |
|---|---|---|---|---|---|---|---|
| Example 5 | 1970 | 138 | 2H | $0.9 \times 10^{-4}$ | 1.3 | 1.3 | ⊚ |
| Comparative Example 3 | 1810 | 135 | H | $1.2 \times 10^{-4}$ | 1.5 | 1.5 | Δ |
| Comparative Example 4 | 1810 | 135 | H | $1.2 \times 10^{-4}$ | 1.5 | 1.5 | Δ |
| Example 6 | 2130 | 137 | 2H | $0.9 \times 10^{-4}$ | 1.3 | 1.2 | ○ |
| Comparative Example 5 | 1640 | 121 | F | $1.3 \times 10^{-4}$ | 1.6 | 1.6 | X |

From the results shown in Table 4 and Table 5, compared with the polypropylenes obtained in the Comparative Examples 3, 4, and 5, it is clear that the polypropylenes obtained in the Examples 5 and 6 have higher degrees of crystallinity, proportions of R-lamella, heats of fusion, moduli of elasticity, HDTs, and scratch resistances, in addition, they have lower linear expansion ratios and contraction ratios, they are superior in mechanical and thermal properties, and they are superior in the low level of odor produced during molding.

In addition, from the results of Example 5 and Comparative Examples 3 and 4, it is clear that it is possible to obtain a polypropylene having a high degree of crystallinity and a high proportion of R-lamella, by means of carrying out the washing of the polypropylene at a high temperature.

[Examples 7~9]

A propylene/ethylene block copolymer (MFR=11.0, ethylene content of 9.2% by weight, and an amount of copolymerization of 20% by weight) used as the propylene/α-olefin block copolymer was mixed with the highly crystalline polypropylene obtained in Example 5 in the mixing ratios shown in Table 6, and pellets were obtained by means of melt-kneading at a resin temperature of 230° C. in twin screw extruder KTX-37 manufactured by Kobe Steel Ltd. Using these pellets, injection molding was carried out using the same method as in Example 5, and the tensile yield strength, the tensile breaking elongation at break, the flexural strength, the flexural modulus, the Izod impact strength, and the heat distortion temperature were measured. The results are shown in Table 6.

An injection-molded article formed from the propylene/(α-olefin block copolymer alone had a tensile yield strength of 280 kgf/cm$^2$, a tensile elongation at break of 30%, a flexural strength of 340 kgf/cm$^2$, a flexural modulus of 12500 kgf/cm$^2$, an Izod impact strength at 23° C. of 15 kgf-cm/cm$^2$, and a heat distortion temperature of 112° C.

[Comparative Examples 6~8]

The polypropylene obtained in Comparative Example 3 and a propylene/ethylene block copolymer (MFR=11.0, ethylene content of 9.2% by weight, and an amount of copolymerization of 20% by weight) were mixed and pellets were obtained in the same way as for Examples 7–9 with the exception that the mixing ratios were those shown in Table 7. Using these pellets, injection molding was carried out using the same method as in Example 5, and the tensile yield strength, the tensile elongation at break, the flexural strength, the flexural modulus, the Izod impact strength, and the heat distortion temperature were measured. The results are shown in Table 7.

TABLE 6

| | Example 5 | Example 7 | Example 8 | Example 9 |
|---|---|---|---|---|
| Composition | | | | |
| Content of Highly Crystalline Polypropylene of Example 5 (wt %) | 100 | 80 | 70 | 50 |
| Content of Polypopylene/α-olefin Block Copolymer (wt %) | 0 | 20 | 30 | 50 |
| MFR of composition (g/10 min) | 28.5 | 22.8 | 21.2 | 17.3 |

TABLE 6-continued

|  | Example 5 | Example 7 | Example 8 | Example 9 |
|---|---|---|---|---|
| Properties of the Injection-molded Article | | | | |
| Tensile Yield Strength (kgf/cm$^2$) | 400 | 380 | 370 | 360 |
| Tensile Elongation at Break (%) | 40 | 40 | 50 | 50 |
| Flexural Strength (kgf/cm$^2$) | 430 | 410 | 400 | 390 |
| Flexural Modulus (kgf/cm$^2$) | 20100 | 18900 | 17500 | 16800 |
| Izod Impact Strength | | | | |
| 23° C. (kgf-cm/cm$^2$) | 2 | 3.5 | 4.7 | 6.2 |
| −20° C. (kgf-cm/cm$^2$) | 1.5 | 2.6 | 2.9 | 3.4 |
| Heat Distortion Temperature (° C.) | 138 | 134 | 130 | 126 |

TABLE 7

|  | Comparative Example 3 | Comparative Example 6 | Comparative Example 7 | Comparative Example 8 |
|---|---|---|---|---|
| Composition | | | | |
| Content of Highly Crystalline Polypropylene of Comparative Example 3 (wt %) | 100 | 80 | 70 | 50 |
| Content of Polypopylene/α-olefin Block Copolymer (wt %) | 0 | 20 | 30 | 50 |
| MFR of composition (g/10 min) | 34 | 26.5 | 23.2 | 19.5 |
| Properties of the Injection-molded Article | | | | |
| Tensile Yield Strength (kgf/cm$^2$) | 380 | 380 | 370 | 350 |
| Tensile Elongation at Break (%) | 30 | 40 | 40 | 50 |
| Flexural Strength (kgf/cm$^2$) | 400 | 390 | 370 | 370 |
| Flexural Modulus (kgf/cm$^2$) | 18500 | 17200 | 16400 | 15200 |
| Izod Impact Strength | | | | |
| 23° C. (kgf-cm/cm$^2$) | 1.9 | 3.4 | 4.8 | 6.1 |
| −20° C. (kgf-cm/cm$^2$) | 1.5 | 2.4 | 2.9 | 3.1 |
| Heat Distortion Temperature (° C.) | 135 | 131 | 125 | 121 |

As shown in Table 6 and Table 7, when Example 5 and Comparative Example 3; Example 7 and Comparative Example 6; Example 8 and Comparative Example 7; and Example 9 and Comparative Example 8 are respectively compared, the polypropylenes shown in Examples 5, and 7~9 obtained higher values for each of the tensile yield strength, the tensile elongation at break, flexural strength, flexural modulus, and heat distortion temperature, and it is clear that by using a highly crystalline polypropylene, it is possible to obtain an injection-molded article which is superior in both rigidity and heat resistance.

In addition, when Example 7 and Comparative Example 3, Example 8 and Comparative Example 6; and Example 9 and Comparative Example 7 are respectively compared, they are equivalent in tensile yield strength, the tensile elongation at break, flexural strength, flexural modulus, and heat distortion temperature, but the Izod impact strength for Examples 7~9 is higher. This confirms that if a suitable amount of propylene/α-olefin block copolymer is added to the highly crystalline polypropylene, it is possible to obtain a molded product which has a superior balance in rigidity and impact strength.

[Examples 10 and 11]

Pellets were obtained in the same way as in Examples 7 to 9 with the exception that talc and the highly crystalline polypropylene obtained in Example 5 were mixed in the proportions shown in Table 8. Using these pellets, injection molding was carried out using the same method as in Example 5, and the flexural modulus, the Izod impact strength, and the heat distortion temperature were measured. The results are shown in Table 8.

[Comparative Examples 9 and 10]

Pellets were obtained in the same way as in Examples 7 to 9 with the exception that talc and the highly crystalline polypropylene obtained in Example 5 were mixed in the proportions shown in Table 8 and mixed in the proportions shown in Table 9. Using these pellets, injection molding was carried out using the same method as in Example 5, and the flexural modulus, the Izod impact strength, and the heat distortion temperature were measured. The results are shown in Table 9.

TABLE 8

|  | Example 5 | Example 10 | Example 11 |
|---|---|---|---|
| Composition | | | |
| Content of Highly Crystalline Polypropylene of Example 5 (parts by weight) | 100 | 100 | 100 |
| Content of Talc (parts by weight) | 0 | 15 | 30 |
| MFR of composition (g/10 min) | 28.5 | 29.2 | 27.1 |
| Flexural Modulus (kgf/cm$^2$) | 20100 | 38100 | 51500 |
| Izod Impact Strength | | | |
| 23° C. (kgf · cm/cm$^2$) | 1.5 | 1.6 | 1.8 |
| Heat Distortion Temperature (° C.) | 138 | 142 | 147 |

TABLE 9

|  | Comparative Example 3 | Comparative Example 9 | Comparative Example 10 |
|---|---|---|---|
| Composition | | | |
| Content of Highly Crystalline Polypropylene of Comparative Example 3 (parts by weight) | 100 | 100 | 100 |
| Content Talc (parts by weight) | 0 | 15 | 30 |
| MFR of composition (g/10 min) | 34 | 34 | 35 |
| Flexural Modulus (kgf/cm$^2$) | 18500 | 36300 | 48900 |
| Izod Impact Strength | | | |
| 23° C. (kgf · cm/cm$^2$) | 1.9 | 1.7 | 2 |
| Heat Distortion Temperature (° C.) | 135 | 138 | 143 |

As shown in Table 8 and Table 9, by means of the addition of talc, it is possible to obtain a polypropylene which is even more superior in mechanical strength and heat resistance.

Examples 12 and 13

Pellets were obtained in the same way as in Examples 7~9 with the exception that TAFMER P-0480 manufactured by Mitsui Petrochemical Co.Ltd., used as the EPR, and the highly crystalline polypropylene obtained in Example 5 were mixed in the proportions shown in Table 10. Using these pellets, injection molding was carried out using the same method as in Example 5, and the flexural modulus, the Izod impact strength, and the heat distortion temperature were measured. The results are shown in Table 10.

Comparative Examples 11 and 12

Pellets were obtained in the same way as in Examples 7~9 with the exception that TAFMER P-0480 manufactured by Mitsui Petrochemical Co.Ltd., used as the EPR, and the highly crystalline polypropylene obtained in Comparative Example 3 were mixed in the proportions shown in Table 11. Using these pellets, injection molding was carried out using the same method as in Example 5, and the flexural modulus, the Izod impact strength, and the heat distortion temperature were measured. The results are shown in Table 11.

TABLE 10

|  | Example 5 | Example 12 | Example 13 |
|---|---|---|---|
| Composition |  |  |  |
| Content of Highly Crystalline Polypropylene of Example 5 (wt %) | 100 | 80 | 60 |
| Content of EPR (wt %) | 0 | 20 | 40 |
| MFR of composition (g/10 min) | 28.5 | 16.4 | 9.5 |
| Flexural Modulus (kgf/cm²) | 20100 | 16200 | 12100 |
| Izod Impact Strength |  |  |  |
| 23° C. (kgf · cm/cm²) | 1.5 | 7.1 | 53.3 |
| Heat Distortion Temperature (° C.) | 138 | 128 | 118 |

TABLE 11

|  | Comparative Example 3 | Comparative Example 11 | Comparative Example 12 |
|---|---|---|---|
| Composition |  |  |  |
| Content of Highly Crystalline Polypropylene of Comparative Example 3 (wt %) | 100 | 80 | 60 |
| Content of EPR (wt %) | 0 | 20 | 40 |
| MFR of composition (g/10 min) | 34 | 18.9 | 9.7 |
| Flexural Modulus (kgf /cm²) | 18500 | 14900 | 11000 |
| Izod Impact Strength |  |  |  |
| 23° C. (kgf · cm/cm²) | 1.9 | 7.2 | 55.9 |
| Heat Distortion Temperature (° C.) | 135 | 125 | 111 |

As shown in Table 10 and Table 11, it is clear that Izod impact strength is remarkably improved by the addition of EPR.

[Example 14~17]

A propylene/ethylene block copolymer (MFR=11.0, ethylene content of 9.2% by weight, and an amount of copolymerization of 20% by weight), used as the HIPP, was mixed with the highly crystalline polypropylene obtained in Example 5 and talc in the proportions shown in Table 12, and, with the exception of these changes, pellets were obtained using the same method as in Examples 7~9. Using these pellets, injection molding was carried out using the same method as in Example 5, and the flexural modulus, the Izod impact strength, and the heat distortion temperature were measured. The results are shown in Table 12.

[Comparative Examples 13~16]

A propylene/ethylene block copolymer (MFR=11.0, ethylene content of 9.2% by weight, and an amount of copolymerization of 20% by weight), used as the HIPP, was mixed with the highly crystalline polypropylene obtained in Comparative Example 3 and talc in the proportions shown in Table 12, and, with the exception of these changes, pellets were obtained using the same method as in Examples 7~9. Using these pellets, injection molding was carried out using the same method as in Example 5, and the flexural modulus, the Izod impact strength, and the heat distortion temperature were measured. The results are shown in Table 13.

TABLE 12

|  | Example 5 | Example 15 | Example 16 | Example 17 |
|---|---|---|---|---|
| Composition |  |  |  |  |
| Content of Highly Crystalline Polypropylene of Example 5 (wt %) | 100 | 80 | 70 | 50 |
| Content of HIPP (wt %) | 0 | 20 | 30 | 50 |
| Content of Talc (parts by weight) | 15 | 15 | 15 | 15 |
| MFR of composition (g/10 min) | 29 | 24.2 | 22 | 18.5 |
| Flexural Modulus (kgf/cm²) | 38100 | 30500 | 26800 | 20100 |
| Izod Impact Strength |  |  |  |  |
| 23° C. (kgf · cm/cm²) | 1.8 | 3.6 | 5.1 | 6.4 |
| Heat Distortion Temperature (° C.) | 142 | 138 | 133 | 128 |

TABLE 13

|  | Comparative Example 13 | Comparative Example 14 | Comparative Example 15 | Comparative Example 16 |
|---|---|---|---|---|
| Composition |  |  |  |  |
| Content of Highly Crystalline Polypropylene of Comparative Example 3 (wt %) | 100 | 80 | 70 | 50 |
| Content of HIPP (wt %) | 0 | 20 | 30 | 40 |
| Content of Talc (parts by weight) | 15 | 15 | 15 | 15 |
| MFR of composition (g/10 min) | 35 | 27.1 | 23.8 | 20.6 |
| Flexural Modulus (kgf/cm²) | 36300 | 29100 | 25400 | 18300 |
| Izod Impact Strength |  |  |  |  |
| 23° C. (kgf · cm/cm²) | 2 | 3.7 | 4.7 | 6.5 |
| Heat Distortion Temperature (° C.) | 138 | 135 | 127 | 122 |

As shown in Table 12 and Table 13, when compared to the resin compositions of Comparative Examples 13~16, it is clear that the resin compositions of Examples 14~17 give molded articles which are superior in rigidity and heat resistance.

[Examples 18 and 19]

2,2-methylene bis (4,6-di-t-butylphenyl) sodium phosphate, used as the crystal nucleating agent, was mixed with the highly crystalline polypropylene obtained in Example 5 in the proportions shown in Table 14, and, with the exception of these changes, pellets were obtained using the same method as in Examples 7~9. Using these pellets, injection molding was carried out using the same method as in Example 5, and the flexural modulus and the heat distortion temperature were measured. The results are shown in Table 14.

[Comparative Examples 17~18]

Sodium 2,2-methylene bis (4,6-di-t-butylphenyl) phosphate, used as the crystal nucleating agent, was mixed with the highly crystalline polypropylene obtained in Comparative Example 5 in the proportions shown in Table 14, and, with the exception of these changes, pellets were obtained using the same method as in Examples 7~9. Using these pellets, injection molding was carried out using the same method as in Example 5, and the flexural modulus and the heat distortion temperature were measured. The results are shown in Table 15.

TABLE 14

|  | Example 5 | Example 18 | Example 19 |
|---|---|---|---|
| Composition |  |  |  |
| Content of Polypropylene of Example 5 (parts by weight) | 100 | 100 | 100 |
| Nucleating Agent (parts by weight) | 0 | 0.2 | 0.4 |
| Flexural Modulus (MPa) | 1970 | 2490 | 2580 |
| HDT (° C.) | 138 | 144 | 145 |

TABLE 15

|  | Comparative Example 5 | Comparative Example 17 | Comparative Example 18 |
|---|---|---|---|
| Composition |  |  |  |
| Content of Polypropylene of Comparative Example 5 (parts by weight) | 100 | 100 | 100 |
| Nucleating Agent (parts by weight) | 0 | 0.2 | 0.4 |
| Flexural Modulus (MPa) | 1510 | 1960 | 2020 |
| HDT (° C.) | 119 | 136 | 137 |

As shown in Table 14 and Table 15, when 0.2 parts by weight of a nucleating agent are added, with respect to the highly crystalline polypropylene of Example 5, the flexural modulus increases 520 MPa (comparison of Example 5 and Example 18), and when 0.4 parts by weight of nucleating agent are added, the flexural modulus increases 610 MPa (comparison of Example 5 and Example 19).

In contrast to this, when 0.2 parts by weight of a nucleating agent are added with respect to the polypropylene of Comparative Example 5, the flexural modulus increases 450 MPa (comparison of Comparative Example 5 and Comparative Example 17), and when 0.4 parts by weight of nucleating agent are added, the flexural modulus increases 510 MPa (comparison of Comparative Example 5 and Comparative Example 18).

Consequently, compared with conventional polypropylene, it is clear that effects of the addition of a nucleating agent are better for the highly crystalline polypropylene of the present invention.

Industrial Applicability

Molded articles produced using the highly crystalline polypropylene of the present invention or resin compositions which contain the highly crystalline polypropylene of the present invention are superior in rigidity, heat resistance, scratch resistance, dimensional stability, and low odor production at the time of molding, and can be used widely for various purposes such as in automobile parts, in household electrical goods, and the like.

What is claimed is:

1. A highly crystalline polypropylene, characterized by
   having a degree of crystallinity of at least 50.5% calculated from the heat of fusion; and
   (1) having a relationship between a proportion of R-lamella f(R) with respect to spherulites and a weight-average molecular weight Mw which satisfies the following Formula (II);
   (2) wherein said proportion of R-lamella f(R) with respect to spherulites is calculated using the following Formula (I), in which a birefringence Δn of crystallized spherulites is obtained by melting said highly crystalline polypropylene at 230° C. for 5 minutes, cooling to a temperature of 132° C. at a cooling rate of 20° C./minute, and then maintaining said temperature for 90 minutes;

$$f(R)=(-\Delta n+0.0351)\times 100/0.0528 \qquad \text{Formula (I)}$$

$$f(R)>-2.5\times(\log\{Mw\}-4)^2+88.9 \qquad \text{Formula (II)}.$$

2. A highly crystalline polypropylene according to claim 1 characterized by said highly crystalline polypropylene being obtained by melting and then crystallizing at at least 130° C. and less than 160° C.

3. A resin composition characterized by comprising
   100 parts by weight of a highly crystalline polypropylene according to claim 1, and
   no more than 30 parts by weight of a filler.

4. A resin composition characterized by comprising:
   at least 30% by weight of a highly crystalline polypropylene according to claim 1; and
   no more than 70% by weight of a propylene/α-olefin block copolymer.

5. A resin composition characterized by comprising:
   at least 60% by weight of a highly crystalline polypropylene according to claim 1; and
   no more than 40% by weight of an ethylene-propylene rubber.

6. A resin composition characterized by comprising:
   100 parts by weight of a mixture comprising at least 30% by weight of a highly crystalline polypropylene according to claim 1, and no more than 70% by weight a propylene/α-olefin block copolymer; and
   no more than 30 parts by weight of a filler.

7. An injection-molded article, characterized by
   being obtained by injection molding a highly crystalline polypropylene according to claim 1.

8. An injection-molded article, characterized by being obtained by injection molding a resin composition according to one of claims 3 to 6.

9. A blow-molded article, characterized by being obtained by blow molding a highly crystalline polypropylene according to claim 1.

10. A blow-molded article, characterized by being obtained by blow molding a resin composition according to one of claims 3 to 6.

11. A compression molded article, characterized by being obtained by compression molding a highly crystalline polypropylene according to claim 1.

12. A compression molded article, characterized by being obtained by compression molding a resin composition according to one of claims 3 to 6.

13. A sheet characterized by comprising: a highly crystalline polypropylene according to claim 1.

14. A sheet characterized by comprising: a resin composition according to one of claims 3 to 6.

15. A film characterized by comprising: a highly crystalline polypropylene according to claim 1.

16. A film characterized by comprising: a resin composition according to one of claims 3 to 6.

17. A laminated molded article, characterized by being obtained by lamination molding a highly crystalline polypropylene according to claim 1.

18. A laminated molded article, characterized by being obtained by lamination molding a resin composition according to one of claims 3 to 6.

19. An extrusion molded article, characterized by being obtained by extrusion molding a highly crystalline polypropylene according to claim 1.

20. An extrusion molded article, characterized by being obtained by extrusion molding a resin composition according to one of claims 3 to 6.

21. A fiber characterized by comprising: a highly crystalline polypropylene according to claim 1.

22. A fiber characterized by comprising: a resin composition according to one of claims 3 to 6.

* * * * *